No. 12,029. Reissued Sept. 9, 1902.

A. DE VILBISS, JR.

SCALE.

(Application filed Dec. 19, 1901.)

2 Sheets—Sheet 1.

Witnesses:
Harold S. Barnes
Horace King

Inventor:
Allen De Vilbiss Jr.
By Rector & Stibbens
His Attys.

No. 12,029. Reissued Sept. 9, 1902.

A. DE VILBISS, JR.

SCALE.

(Application filed Dec. 19, 1901.)

2 Sheets—Sheet 2.

Witnesses:
Harold G. Barrett
Florence Ling.

Inventor:
Allen De Vilbiss Jr.
By Rector & Nissen
His Attys.

UNITED STATES PATENT OFFICE.

ALLEN DE VILBISS, JR., OF TOLEDO, OHIO, ASSIGNOR, BY MESNE ASSIGNMENTS, TO TOLEDO SCALE AND CASH REGISTER COMPANY, OF NEWARK, NEW JERSEY, A CORPORATION OF NEW JERSEY.

SCALE.

SPECIFICATION forming part of Reissued Letters Patent No. 12,029, dated September 9, 1902.

Original No. 655,147, dated July 31, 1900. Application for reissue filed December 19, 1901. Serial No. 86,607.

*To all whom it may concern:*

Be it known that I, ALLEN DE VILBISS, Jr., a citizen of the United States, residing at Toledo, in the county of Lucas and State of Ohio, have invented certain new and useful Improvements in Scales, of which the following is a description, reference being had to the accompanying drawings, forming part of this specification.

My invention relates to what are commonly known as "computing" or "price" scales, being scales which indicate not only the weight of the article or commodity being weighed, but also its value at any given price per pound (or other unit of weight) within the capacity of the scale.

It has for its object, first, the provision of means for increasing the weighing capacity and price-computing range of price-computing scales without materially increasing the size of the computing-table or the number of graduations and figures thereon or reducing the size of such figures, and, second, the provision of means whereby such a scale may be produced by applying the computing attachment to ordinary weighing-scales of well-known type, all as hereinafter more fully described, and particularly pointed out in the claims.

Figure 2:
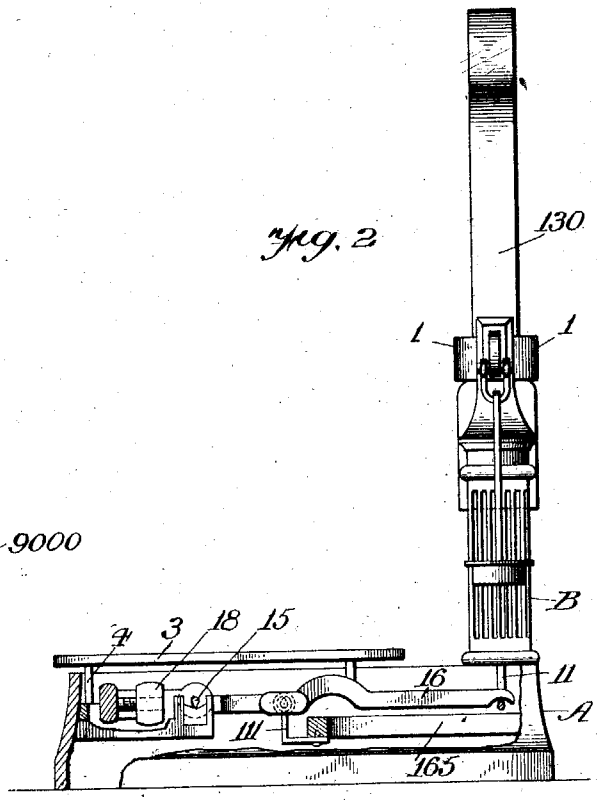
Figure 1:
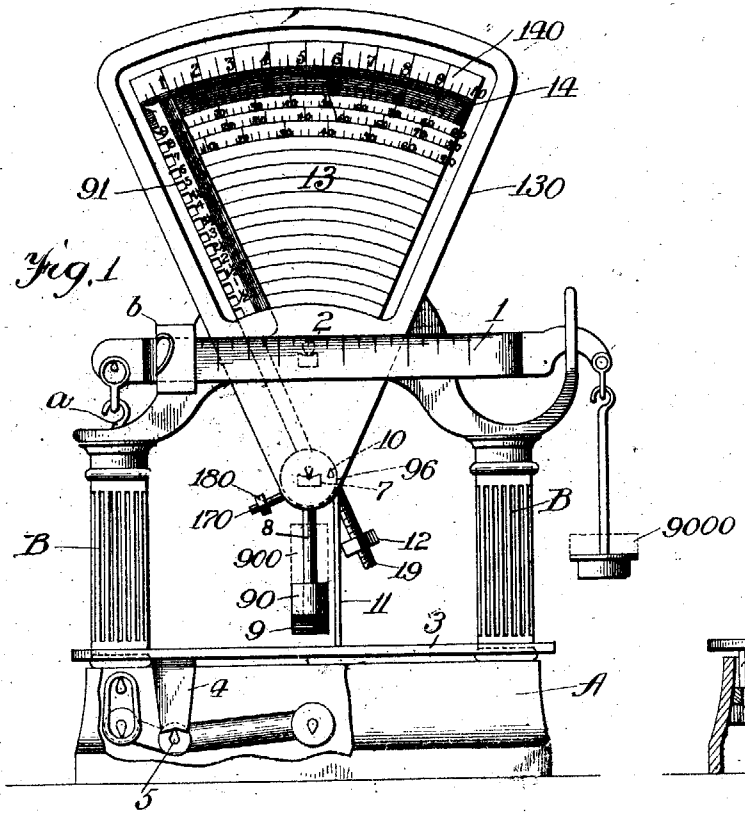
Figure 3:
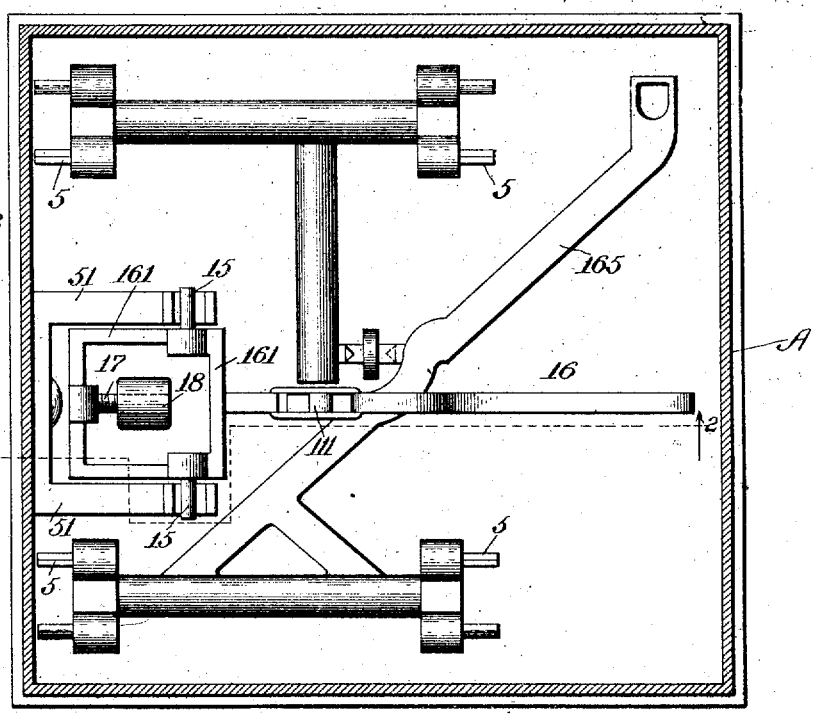
Figure 4:
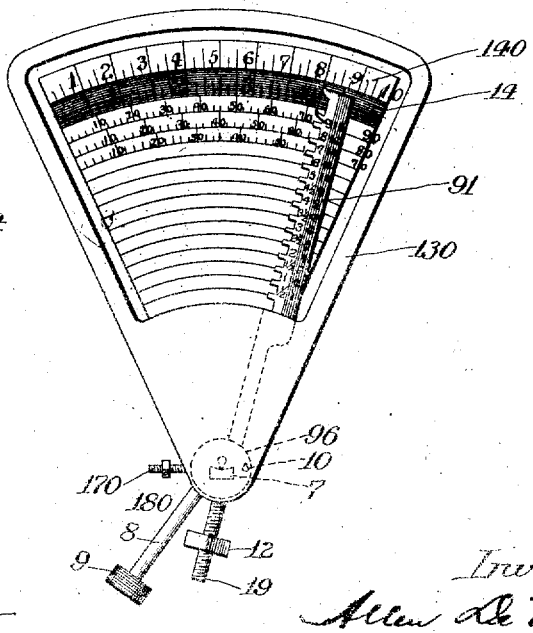

In the accompanying drawings, Figure 1 is an elevation of an ordinary form of grocer's weighing-scale with its base partly broken away and with my improved price-computing attachment applied thereto; Fig. 2, an elevation of the right side of Fig. 1 with the base broken away to expose the parts within, some of which are shown in section; Fig. 3, a plan view of the mechanism within the base, and Fig. 4 an elevation of the price-computing attachment detached from the remainder of the scale.

The same characters of reference are used to indicate corresponding parts of the different views.

The framework of the scale illustrated in the drawings comprises the rectangular base A, containing the mechanism shown in Fig. 3 and hereinafter referred to, the two posts or columns B B, rising from its opposite rear corners, and the arch-frame or bracket 6, connecting the upper ends of the column B B. Secured to and supported by the arch 6 is a sector-shaped housing 130, which contains and carries the automatic price-computing devices. This housing 130 is provided in the upper portion of its forward side with a large opening, through which is exposed to view the price-computing table 13, mounted upon the rear wall of the housing and hereinafter more fully described. Fitting between the opposite walls of the housing 130, at its lower end, is a disk 96, provided upon its front and rear sides with central knife-edge projections resting in supporting-bearings 7 upon the front and rear walls of the housing 130. Rigidly secured to and depending vertically from the disk 96 is a pendulum 8, having a fixed or permanent weight 9 secured to its lower end and also adapted to receive a removable weight 90 for a purpose hereinafter explained. Rigidly secured to and projecting upwardly from the disk 96 at an angle to the pendulum 8 is the index-hand 91, hereinafter described, which coöperates with the price-computing table 13.

Pivotally connected to the disk 96 at 10 is the upper end of a vertically-depending link 11, whose lower end is connected within the base A to a member of the lever mechanism within said base in such manner, as hereinafter described, that any weight placed upon the weighing-platform 3, supported on said mechanism, will tend to draw the link 11 downward and turn the disk 96 against the resistance offered by the weight and leverage of the pendulum 8 and swing the index-hand 91 to the right over the computing-table 13. This computing-table is provided with a plurality of curved spaces concentric to the center of the disk 96 or pivotal support of the index-hand 91. The two upper curved spaces are graduated and numbered to represent units of weight, the upper space 140 being graduated and numbered in the present instance to indicate pounds, half-pounds, and quarter-pounds from "1" to "10," while the curved space 14 beneath it is graduated and numbered to represent pounds, half-pounds, quarter-pounds, and eighths of pounds from "1" to "5." The graduations and numbers in the two spaces register or aline with each other radially to the pivotal support of the index-hand 91, so that when the hand is moved to the right to a position indicating any given weight in the upper space 140 it will indicate one-half that weight in the lower space 14. The weight and leverage of the pendulum 8 and its fixed or permanent weight 9 are such under the proper organization of the scale that when any weight is placed upon the platform 3 the index-hand 91 will be swung to the right over the table 13 to a position indicating such weight in the lower weight-unit space 14, the limit of the weighing capacity of the scale under such circumstances being in the present instance five pounds. For the purpose of doubling such weighing capacity the removable weight 90 for the pendulum 8 is provided. This weight 90 is of such size and weight as to exactly double the resistance afforded by the pendulum to any movement of it and the index-hand 91 from their normal position, with the result that when this supplemental weight 90 is placed in position upon the pendulum the weight of any article or commodity placed upon the platform 3 will swing the pendulum and index-hand 91 only one-half as far from normal position as when the fixed weight 9 is employed alone. When the supplemental weight 90 is used, therefore, the weighing capacity of the scale is doubled, and the weight of the article or commodity placed upon the platform 3 is read in the upper curved space 140 upon the computing-table 13 instead of being read in the lower space 14, as before described. For convenience in associating the fixed and removable weights 9 and 90 with the respective weight-unit spaces 14 and 140 upon the computing-table 13 the spaces 14 and 140 or the figures thereon are differently colored and the weights 9 and 90 colored to correspond with the colors of the respective spaces or figures. Thus in the present drawings the space 14 and weight 9 are shaded to indicate a dark color, and the space 140 and weight 90 are left unshaded to indicate a lighter color. The curved spaces beneath the weight-unit spaces 14 and 140 upon the computing-table 13 are severally graduated and numbered to indicate price-totals or the values of different quantities of commodities at different prices per pound indicated by figures upon the index-hand 91 coöperating with such graduations and numbers. The index-hand 91 is provided with two longitudinal rows of numbers, as shown. The numbers in one row are exactly double the respective opposing numbers in the other row and indicate the prices per pound upon which the value is to be computed when the fixed weight 9 is alone employed and when the weight of an article is consequently to be read in the lower weight-unit space 14, while the numbers in the other row represent the prices per pound upon which the value is to be computed when the supplemental weight 90 is employed and when the weight of the article or commodity is therefore to be read in the upper weight-unit space 140, as heretofore explained. Inasmuch as the higher set of numbers upon the index-hand 91 coöperates with the weight-units in the space 14, as above explained, said numbers are for convenience colored to correspond with the numbers in said spaces, and in the present instance the right-hand portion of the index-hand, upon which said row of numbers appears, is shaded to indicate a dark color corresponding to that of the space 14 or the numbers thereon. Likewise the numbers in the left-hand row on the index-hand 91 and the weight-unit numbers in the upper space 140, with which they coöperate, are colored to correspond with each other, and in the present drawings the left-hand portion of the index-hand, upon which the said numbers appear, and the space 140 are both left unshaded to indicate a light color.

Under the above-described provision the operation of the scale is as follows: If an article or quantity of any commodity less than five pounds is to be weighed and its value computed at a given price per pound, the fixed weight 9 upon the pendulum 8 will be used alone, and when the article is placed upon the platform and the index-hand 91 caused to move to the right over the computing-table 13 the weight of the article will be read in the lower weight-unit space 14, while its value will be read in the curved space upon the table 13 coinciding with the number in the right-hand row upon the index-hand 91, which indicates the given price per pound. Thus if the value of an article is to be computed at eighteen cents per pound and the article should weigh four pounds the index-hand 91 would move to the position shown in Fig. 4, and "72 cents," the value of the article, would be read in the uppermost value-computing space upon the table 13, as shown in said figure, while if the value were to be computed at sixteen cents per pound it would be read in the next space beneath opposite the price "16" upon the index-hand, where "64 cents" would appear, and so on through the list of price-per-pound numbers in the right-hand row. The limit of the weighing capacity of the scale illustrated in the drawings is five pounds when the fixed weight 9 on the pendulum 8 is alone employed. Hence if an article weighing more than five pounds is to be weighed and its value computed the supplemental weight 90 will be placed upon the pendulum, in which case it will require a weight of eight pounds upon the platform 3 to swing the index-hand 91 to the position shown in Fig. 4, where under such circumstances the weight of the article would be read in the upper weight-unit space 140, while its value at any given price per pound would be read in the curved price-computing space coinciding with the number in the left-hand row on the index-hand 91, indicating such price per pound.

Thus if the value of the article was to be computed at nine cents per pound it would be read in the uppermost one of said spaces, where the index-hand would indicate "72 cents." If at eight cents per pound, it would be read in the next space beneath, where "64 cents" would be indicated, and so on through the list of price-per-pound numbers in the left-hand row.

As will be understood from the foregoing description, the scale illustrated in the accompanying drawings has a weighing capacity of ten pounds for articles whose value is to be computed at nine cents per pound or less and a weighing capacity of five pounds at prices up to eighteen cents per pound. By the employment of the fixed and supplemental pendulum weights 9 and 90 and the corresponding sets of weight units 14 and 140 and the two sets of price units upon the index-hand 91 both the weighing and price-computing capacity of the scale is increased in the manner described without any substantial increase in the size of the price-computing table 13 or increase in the number or decrease in the size of the figures thereon. The capacity of the scale may be still further increased, if desired, by the employment of a third weight 900, (shown in dotted lines in Fig. 1,) in which event three series of weight units would be provided upon the computing-table and three series of price units upon the index-hand, and if the size and weight of this third weight 900 were such as to multiply threefold the moment of the pendulum or the resistance afforded by it to movement from normal position under the weight of the load upon the scale-platform the numbers of the third series of weight units would be treble the respective numbers in the lower series 14, while the numbers in the third series of price units upon the index-hand would be one-third of the respective numbers in the highest series upon said hand, as will be readily understood.

The weight of the index-hand 91 is counterbalanced by a screw 19, projecting from the opposite side of the disk 96 and carrying an adjustable nut 12, while the weight of the link 11 is counterbalanced by a similar screw 170, projecting from the disk 96 opposite the link-pivot 10 and carrying a nut 180.

Assuming now that my novel computing attachment is to be applied to an ordinary form of grocer's weighing-scale, as illustrated in the accompanying drawings, I will describe the addition to the mechanism of such scale which I have illustrated in the accompanying drawings for the purpose of connecting it with the computing attachment. The scale-platform 3 is provided adjacent its four corners with depending legs 4, Fig. 1, which rest upon the usual knife-edge bearings 5, through which and the usual connections the weight of the load placed upon the platform is transmitted to the main lever 165, Fig. 3, the free end of which lever has connected to it at the left-hand rear corner of the scale the lower end of a link *a*, which is connected at its upper end to the left-hand end of the main scale-beam 1, Fig. 1, which beam is fulcrumed adjacent its middle by knife-edge projections 2, resting in suitable bearings provided for them on the housing 130. For the purpose of connecting the main lever 165 in the scale-base with the price-computing attachment, so that the weight of the load upon the scale-platform may be transmitted through said lever to the index-hand and pendulum, I provide an arm or lever 16, extending from front to rear of the scale-base near its middle, Figs. 2 and 3, and formed at its forward end into a frame 161, provided with projecting knife edges or trunnions 15, resting in suitable bearings formed for them in a yoke 51, secured to the front wall of the scale-base. The knife-edge trunnions 15 constitute the fulcrum of the lever 16, and to counterbalance the latter the frame 161 is provided at its front end with a rearwardly-projecting screw 17, upon which is threaded an adjustable counterbalancing-weight 18.

The main lever 165 has secured to its under side immediately beneath the lever 16 a bent arm or bracket 111, Fig. 2, whose upper end is formed into a hook to engage a knife-edge provided for it on the lever 16, with the result that when the main lever 165 is depressed by the weight of the load upon the scale-platform it will rock the lever 16 upon its fulcrum 15 and draw down its rear end. The latter is connected by the link 11 with the disk 96, which carries the index-hand and pendulum, as heretofore explained, so that the weight of the load upon the scale-platform is transmitted to the computing attachment and the index-hand swung over the computing-table against the resistance offered by the weight and leverage of the pendulum.

The main scale-beam 1 may be employed as a tare-beam and its poise be adjusted lengthwise of it to counterbalance the weight of any receptacle placed upon the scale-platform preparatory to the weighing of some commodity in said receptacle, and the capacity of the beam may be increased, if necessary, by the employment of a weight 9000. (Shown in dotted lines in Fig. 1.)

Having thus described my invention, I claim—

1. In a computing-scale, a price-computing table having a plurality of rows of price-totals, in combination with an index having a plurality of rows of price units of which the correspondingly-arranged numbers in the two rows coöperate with the same price-totals upon the computing-table and indicate values at different prices per pound; substantially as described.

2. In a computing-scale, a price-computing table having a plurality of rows of price-totals, in combination with an index having a plurality of rows of price units arranged side by side and coöperating with the same rows of price-totals upon the computing-table; substantially as and for the purpose described.

3. In a computing-scale, a weighing and price-computing table having a plurality of rows of weight units of which the numbers in one row are multiples of those in the other, and a plurality of rows of price-totals, in combination with an index having a plurality of rows of price units of which the numbers in one row are multiples of those in the other, said rows of price units coöperating with the rows of price-totals upon the computing-table in the manner and for the purpose described.

4. In a computing-scale, a weighing and price-computing table having a plurality of rows of weight units of contrasting colors and of which the numbers in one row are multiples of those in the other, and a plurality of rows of price-totals, in combination with an index having a plurality of rows of price units of contrasting color and of which the numbers in one row are multiples of those in the other, said rows of price units coöperating with the rows of price-totals upon the computing-table in the manner and for the purpose described.

5. In a computing-scale, a weighing and price-computing table having a plurality of rows of weight units, and a plurality of rows of price-totals, in combination with an index having a plurality of rows of price units arranged side by side and of which the numbers in one row and the correspondingly-arranged numbers in the other row coöperate with the same rows of price-totals upon the computing-table in the manner and for the purpose described.

6. In a computing-scale, a weighing and price-computing table having a plurality of rows of weight units of contrasting colors, and a plurality of rows of price units, in combination with an index having a plurality of rows of price units of contrasting color and of which the numbers in one row and the correspondingly-arranged numbers in the other row coöperate with the same rows of price-totals upon the computing-table in the manner and for the purpose described.

7. In a computing-scale, a price-computing table having a plurality of rows of price-totals, in combination with an index having a plurality of rows of price units of which the numbers in one row are multiples of those in the other, said computing-table and index being movable relatively to each other under the influence of the load upon the scale-platform, means for counterbalancing the weight of the load upon the scale-platform and resisting said relative movement of the computing-table and index, and means for multiplying said resistance at will for the purpose described.

8. In a computing-scale, a weighing and price-computing table having a plurality of rows of weight units, and a plurality of rows of price-totals, in combination with an index having a plurality of rows of price units arranged side by side and having the correspondingly-arranged numbers in the several rows coöperating with the same rows of price-totals, said computing-table and index being movable relatively to each other under the influence of the load upon the scale-platform, means for counterbalancing the weight of the load upon the scale-platform and resisting said relative movement of the computing-table and index, and means for multiplying said resistance at will for the purpose described.

9. In a computing-scale, a weighing and price-computing table having a plurality of rows of weight units of contrasting color, and a plurality of rows of price-totals, in combination with an index having a plurality of rows of price units of contrasting color arranged side by side and having the correspondingly-arranged numbers in the several rows coöperating with the same rows of price-totals, said computing-table and index being movable relatively to each other under the influence of the load upon the scale-platform, means for counterbalancing the weight of the load upon the scale-platform and resisting said relative movement of the computing-table and index, and means for multiplying said resistance at will for the purpose described.

10. In a computing-scale, a price-computing table having a plurality of rows of price-totals, in combination with an index having two rows of price units of which the numbers in one row are double those in the other, a weighted pendulum coöperating with the index and computing-table and opposing movement of them relatively to each other, and a supplemental weight applicable to said pendulum to double the resistance offered by it to such relative movement of the index and computing-table; substantially as and for the purpose described.

11. In a price-computing scale, a weighing and price-computing table having two rows of weight units of which the numbers in one row are double those in the other, and a plurality of rows of price-totals, in combination with an index having two rows of price units corresponding to the respective rows of weight units, and of which the numbers in one row are double those in the other, a weighted pendulum coöperating with the index and computing-table and opposing movement of them relatively to each other, and a supplemental weight applicable to said pendulum to double the resistance offered by it to such relative movement of the index and computing-table; substantially as and for the purpose described.

12. In a computing-scale, a weighing and price-computing table having two rows of weight units of contrasting color and of which the numbers in one row are double those in the other, and a plurality of rows of price-totals, in combination with an index having two rows of price units of contrasting color corresponding to the respective rows of weight units and of which the numbers in one row are double those in the other, a weighted pendulum coöperating with the index and computing-table and opposing movement of them relatively to each other, and a supplemental weight applicable to said pendulum to double the resistance offered by it to such relative movement of said index and table; substantially as and for the purpose described.

13. In a computing-scale, a weighing and price-computing table provided with a plurality of concentrically-curved rows of weight units having their graduations and numbers in radial line with each other, and a plurality of curved rows of price-totals concentric to the rows of weight units, in combination with a radial index-hand movable over said table under the influence of the load upon the scale-platform and provided with a plurality of rows of price units arranged side by side and having the correspondingly-arranged numbers in the several rows coöperating with the same rows of price-totals, means for counterbalancing the weight of the load upon the scale-platform and against the resistance of which the index-hand is moved over the computing-table by the weight of such load, and means for multiplying at will the resistance offered to such movement of the index-hand under the weight of said load; substantially as described.

14. In a computing-scale, the computing-table 13 having two rows of weight units 140 and 14, and the plurality of rows of price-totals, in combination with the index-hand 91 having the two rows of price units, the pendulum 8 connected at its upper end to the index-hand 91, the weight 9 normally carried by said pendulum, and the supplemental weight 90 applicable thereto; substantially as and for the purpose described.

15. A computing attachment for scales, comprising a price-computing table, an index movable relatively thereto and provided with a series of price units, in combination with a scale-platform, the usual lever mechanism within the scale-base supporting said platform, the main scale-beam connected with said lever mechanism and provided with a poise movable lengthwise thereof, and a supplemental lever and connections intermediate the lever mechanism within the scale-base and the price-computing attachment for causing the weight of the load placed upon the scale-platform to move the index relatively to the computing-table; substantially as described.

16. A computing attachment for scales, comprising a price-computing table, an index-hand movable thereover and provided with a series of price units, and means for counterbalancing the weight of the load placed upon the scale-platform, against the resistance of which means the index-hand is moved over the computing-table by the weight of such load, in combination with the scale-platform, the usual lever mechanism within the scale-base supporting said platform, the main scale-beam connected with said mechanism and provided with a poise movable lengthwise of the beam, and a supplemental lever and connections intermediate said lever mechanism and the index-hand for causing the weight of the load placed upon the scale-platform to swing the index-hand over the computing-table; substantially as described.

17. In a computing attachment for scales, the housing 130, the computing-table 13, the disk 96 mounted in the lower end of said housing, the index-hand 91 projecting from said disk and coöperating with the table 13, and the weighted pendulum 8 depending from the disk 96, in combination with the scale-base A, the lever mechanism within said base supporting the weighing-platform 3 and comprising the main lever 165, the main scale-beam 1 fulcrumed on the housing 130 and connected at one end to the lever 165 by the link *a*, the supplemental lever 16 fulcrumed in the scale-base and connected to the lever 165, and the link 11 connecting the lever 16 with the disk 96; substantially as described.

18. A computing attachment for scales consisting of a table, a disk pivotally connected thereto and having a pendulum hanging normally vertical and a hand standing normally at zero on the table, both rigid with the disk, a screw projecting from the disk diametrically opposite the hand, and a counterpoise-nut thereon; combined with an arm pivoted within the base, a link connecting one end with a pivot on said disk, a connecting-link connecting said arm with the scale mechanism within the base, and means for counterbalancing the weight of the arm and link; substantially as described.

19. A computing attachment for scales consisting of a table, a pendulum and hand standing at angles to each other and pivotally connected to said table at their point of juncture, and means for counterbalancing the weight of the hand when the pendulum stands vertical; combined with an arm pivoted within the base and arched over and connected with the main lever of the mechanism therein, a link connecting the outer end of the arm with said pendulum at a point normally above the pivot of the latter, and means for counterbalancing the weight of the arm and link, substantially as described.

20. A computing attachment for scales consisting of a table, a pendulum and index at an angle to each other and pivotally connected to said table at their point of juncture; combined with an arm within the base connected respectively with the mechanism therein and with the pendulum, a frame at the inner end of the arm, alined pivots projecting laterally therefrom, a yoke carried by the base and having bearings for said pivots, and an adjustable counterpoise for the arm located within the frame, as and for the purpose set forth.

21. A computing attachment for scales consisting of a table, and a pendulum and index standing at an angle to each other and pivotally connected to said table at their point of juncture; combined with an arm within the base connected respectively with the mechanism therein and with the pendulum, a frame at the inner end of the arm, pivots for supporting this frame, a screw projecting from its outer side toward and in alinement with the body of the arm, and a counterpoise threaded upon said screw, as and for the purpose set forth.

22. A computing attachment for scales consisting of a table, a pendulum, a hand moved by the pendulum over the table, and an arm within the base connected at its outer end with said pendulum; combined with a frame carried rigidly by the inner end of the arm, outwardly-projecting alined knife-edge pivots on the frame, a yoke within the base having bearings for said pivots, a screw within the frame in alinement with the body of the arm, and a counterpoise-weight adjustable thereon, all as and for the purpose set forth.

ALLEN DE VILBISS, JR.

Witnesses:
F. M. HIESTER,
EMMA EIBEN.